Feb. 7, 1956  W. O. REED  2,734,145
STORAGE ELECTRODE FOR A SIGNAL STORAGE DEVICE
Filed Oct. 27, 1949
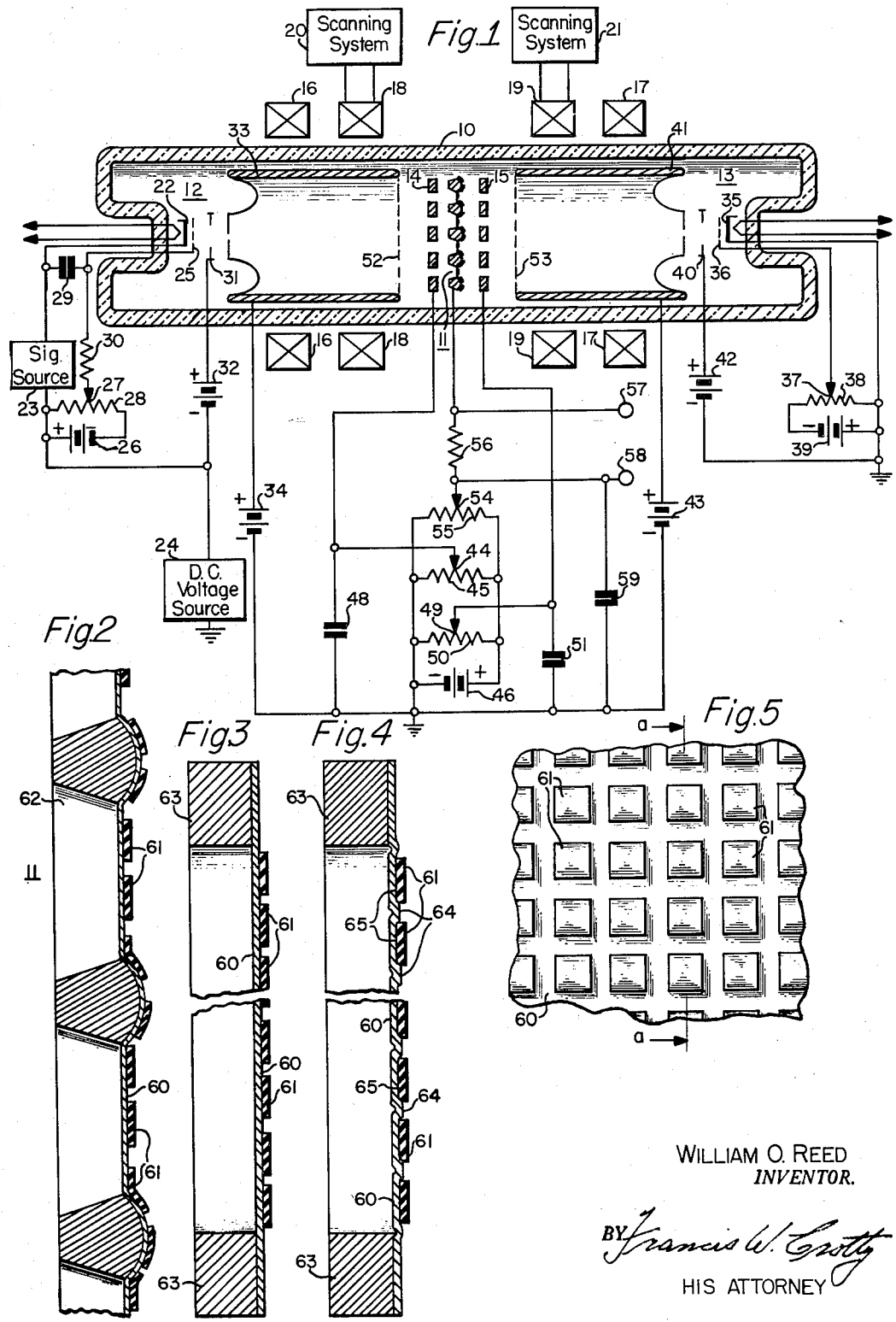
WILLIAM O. REED
INVENTOR.
BY Francis W. Crotty
HIS ATTORNEY

United States Patent Office 2,734,145
Patented Feb. 7, 1956

2,734,145

STORAGE ELECTRODE FOR A SIGNAL STORAGE DEVICE

William O. Reed, Chicago, Ill., assignor to The Rauland Corporation, a corporation of Illinois Application October 27, 1949, Serial No. 123,805

9 Claims. (Cl. 313—283)

This invention relates to signal-storage devices, and more particularly to a novel storage electrode for such devices.

In the copending application of Constantin S. Szegho and William O. Reed filed June 16, 1949, Serial Number 99,421 and assigned to the same assignee as is the present application, now Patent 2,687,492, issued August 24, 1954, there is disclosed and claimed a signal storage device which has certain important characteristics. These include operation at relatively low power supply voltages as compared with prior devices, storage of half-tone signals, storage of signals for controllable periods of time, and storage of signals for indefinitely long periods of time. Also disclosed and claimed is a particular storage electrode which is employed in the signal-storage device there set forth. The storage electrode here to be described may be utilized in a manner substantially similar to that of the afore-mentioned storage electrode and for convenience the present invention will be described in that connection.

An object of the invention is to provide a novel storage electrode for a signal-storage device.

It is a further object of the invention to provide a novel storage electrode for a signal-storage device of the type which may be utilized to effect operation at low power supply voltages, storage of half-tone signals and long-time signal storage.

In accordance with the present invention the storage electrode for a signal-storage device consists essentially of an electron-permeable, imperforate sheet of conductive material having a thickness less than the planar dimensions thereof. A plurality of secondary-electron-emissive dielectric islands are uniformly distributed on one surface of the sheet and extend therefrom for a distance of the order of magnitude of the thickness of the sheet.

A particular embodiment of the invention comprises an electron-permeable, imperforate sheet of conductive material having a thickness less than the planar dimensions thereof. A plurality of dielectric islands are distributed in a predetermined pattern on one surface of the sheet and extend therefrom for a distance of the order of magnitude of the thickness of the sheet. There is provided a supporting structure for the sheet which is immediately adjacent the sheet and which extends in a plane parallel thereto. The supporting structure includes a plurality of apertures each having an area larger than the areas of individual ones of the dielectric islands.

In still another embodiment of the invention, the storage electrode consists essentially of a conductive, electron-permeable sheet having a thickness less than the planar dimensions thereof and which includes a pattern of conductive segments electrically connected therewith. The segments extend from the sheet to a plane parallel thereto and define a plurality of indentations. A plurality of dielectric islands are disposed within individual ones of the indentations in the conductive sheet and extend to a plane substantially coplanar with the plane of the conductive segments.

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which:

Fig. 1 is a sectional view, partly schematic, of a signal storage device including a storage electrode constructed in accordance with the present invention;

Fig. 2 is a cross sectional view, of one embodiment of the present invention, similar to that taken along line a—a of Fig. 5;

Figs. 3 and 4 are similar sectional views of two other embodiments of the invention; and, Fig. 5 is a fragmentary plan view of one embodiment of the present invention.

The signal storage device of Fig. 1 comprises an evacuated glass envelope 10 which encloses a storage electrode 11 constructed in accordance with the present invention and which will be described more fully hereinafter. The evacuated envelope 10 also encloses a pair of electron guns 12 and 13 which constitute electrode systems for projecting respectively recording or writing and reproducing or reading cathode-ray beams on storage electrode 11.

Decelerating electrodes 14 and 15 are disposed on opposite sides of storage electrode 11. Magnetic focusing coil 16 and deflection coil 18 are associated with electron gun 12 and magnetic focusing coil 17 and deflection coil 19 are associated with electron gun 13. The deflection coils associated with the electron guns 12 and 13 are connected to scanning systems 20 and 21, respectively. The scanning systems 20 and 21 operate to cause the writing beam to scan storage electrode 11 during writing intervals and to cause the reading beam to scan storage electrode 11 during reading intervals in well known manner. Scanning systems 20 and 21 may be conventional television type sweep signal generators; however, any other desired type of scanning may be employed. Focusing coils 16 and 17 are coupled to a suitable potential source (not shown) which provides the proper focusing currents in these coils. For convenience of reference, electron gun 12 is hereinafter termed the writing gun and electron gun 13 is termed the reading gun.

The cathode 22 of writing gun 12 is returned to ground through a signal source 23 and a suitable source of unidirectional operating potential 24. The control grid 25 of electron gun 12 is maintained at a fixed direct potential relative to cathode 22 by means of a suitable negative biasing potential source here shown as a battery 26. The bias of control grid 25 relative to cathode 22 may be adjusted as desired by means of a variable tap 27 on resistor 28 which shunts battery 26. A coupling condenser 29 is connected between cathode 22 and control grid 25 and a decoupling resistor 30 is connected between control grid 25 and tap 27. The first accelerating electrode 31 of electron gun 12 is maintained at a constant positive unidirectional operating potential with respect to cathode 22 by means of a battery 32. The second accelerating electrode 33 of electron gun 12 is returned to ground through a suitable source of positive unidirectional operating potential, here shown as a battery 34.

The cathode 35 of electron gun 13 is preferably connected to ground. The control grid 36 of this gun is connected to a variable tap 37 on a resistor 38 which is connected to cathode 36 and in shunt with a battery 39 or other suitable negative biasing potential source. First and second accelerating electrodes 40 and 41 are maintained at suitable positive unidirectional operating potentials by means of batteries 42 and 43, respectively.

Decelerating electrode 14, which is intermediate accelerating electrode 33 and a target 11, is connected to a variable tap 44 on a potentiometer 45 in parallel with a constant potential source here shown as a battery 46, the negative terminal of which is grounded. A bypass condenser 48 is connected between variable tap 44 and ground. Similarly, decelerating electrode 15, which is intermediate accelerating electrode 41 and target 11, is connected to a variable tap 49 on a potentiometer 50 which is shunted across battery 46. A bypass condenser 51 is connected between tap 49 and ground.

Wide-mesh screens 52 and 53 are preferably provided to close the anode cylinders 33 and 41, respectively, in order to insure substantially uniform electrostatic fields between anodes 33 and 41 and decelerating electrodes 14 and 15.

The storage electrode 11 includes a conductive portion connected to a variable tap 54 on a potentiometer 55 through a load resistor 56, and potentiometer 55 is connected in parallel with battery 46. Output terminals 57 and 58 are connected to the opposite terminals of load resistor 56, and the output terminal 58 is bypassed to ground by means of a condenser 59. Terminals 57 and 58 may be connected to the input circuit of a monitoring cathode-ray tube or image-reproducing device (not shown).

The operation of the signal storage device just described is similar to the operation of the signal storage device disclosed in the afore-mentioned Szegho-Reed application. For a complete description of the method of operation, reference is made to that application.

Briefly, however, the operation of the signal storage device is as follows: Storage electrode or target 11 of the present invention, as well as that described in the afore-mentioned copending application, is characterized by operation in one of three operating regions in the presence of impinging electrons from electron guns 12 and 13, depending on the velocity with which the electrons impinge thereupon. In a first region, the secondary emission of the target is less than the number of incident primary electrons, in a second region the number of secondary electrons is greater than the number of impinging primary electrons, and in a third region the number of secondaries is again less than the number of primaries. This aspect of secondary emission is well understood in the art. As pointed out in the afore-mentioned application, the voltage with which primary electrons from writing gun 12 are accelerated is adjusted by means of the variable components of the "writing" portion of the system so that in a preferred mode of operation, the number of secondary electrons being emitted is less than the number of incident primary electrons, the adjustment being carried to a point below the boundary or cross-over between the first and second operating regions or beyond the cross-over between the second and third regions. The initial adjustment being completed, a charge image may be placed on target 11 by means of writing gun 12 and some time later this image may be read by reading gun 13, output signals being taken at terminals 57 and 58. For long time storage operation, the "reading" portion system is so adjusted that when storage electrode 11 is "read," any decay of the charge image is replenished by electrons from electron gun 13.

Turning now to one embodiment of the present invention, the storage electrode 11 of Fig. 2 includes an electron-permeable, imperforate sheet of conductive material 60, such as aluminum. The sheet has a thickness less than the planar dimensions thereof and preferably is in the nature of a thin film less than 10,000 angstroms thick. In a particular example, the film has the thickness in the neighborhood of 2,000 angstroms. In any event, the thickness is such that impinging electrons penetrate the sheet when accelerated through a potential similar to that supplied by the "writing" portion of the system of the signal storage device shown in Fig. 1.

A plurality of dielectric islands, of silicon dioxide for example, indicated by the reference numeral 61, are distributed on one surface of the sheet and extend therefrom for a distance of the order of magnitude of the thickness of sheet 60. Each of the islands 61 is isolated from the others, the only physical connection being completed through the body of sheet 60. In one example, the islands cover approximately 60% of the area of the sheet.

A supporting structure 62 is provided for the sheet, immediately adjacent and extending in a plane parallel to the sheet. The support 62 is, in one example, a mesh screen including a plurality of apertures or interstices each having an area larger than the area of individual ones of the dielectric islands 61. Preferably, structure 62 is constructed of an electrically conductive material, copper or nickel for example, and is electrically connected with sheet 60. Neglecting the distortion of sheet 60 from the plane thereof, which results from the shape of supporting structure 62, Fig. 5 illustrates the distribution of the islands 61 on sheet 60.

The modified structure illustrated in Fig. 3 includes a sheet or film 60 with a plurality of dielectric islands disposed similar to that employed in the embodiment of Fig. 2. However, instead of a supporting grid, the sheet 60 is supported by a conductive ring member 63 of aluminum, for example. In other words, sheet 60 resembles a diaphragm which is suspended from a ring 63 and which covers the opening of the ring. For this embodiment a thickness of approximately 5,000 angstroms is preferred for sheet 60. The dielectric islands are arranged on the sheet as illustrated in Fig. 5.

The modified form of storage electrode represented in Fig. 4 is generally similar to that of Fig. 3 and may likewise be supported by a peripheral ring 63. However, this storage electrode includes a pattern of conductive segments 64, electrically connected with conductive sheet 60. These segments may take the form of additional portions affixed to an imperforate sheet, or an imperforate sheet may be deformed to provide the segments 64. Segments 64 individually extend the same distance from the plane of sheet 60, a distance of the order of magnitude of the thickness of the sheet. Further, the segments 64 have a spatial distribution relative to sheet 60 which is represented by the portions of Fig. 5 unoccupied by islands 61 and thereby define a pattern of cup-like indentations 65. Each of the plurality of dielectric islands 61 is disposed within an individual one of indentations 65 and extends substantially to the plane of conductive segments 64.

As represented in Fig. 5, the embodiments of Figs. 2, 3 and 4 include a plurality of dielectric islands 61, distributed in a regular pattern on one surface of sheet 60. This pattern is represented by the interstices of a mesh; in other words, looking at the plane of sheet 60, the exposed portions of the sheet, or those not covered by islands 61, appear mesh-like in form. However, it is to be understood that the particular spatial distribution there shown is merely by way of an illustrative example and any other suitable arrangement may be employed.

Any of the embodiments of Figs. 2, 3 or 4 may be utilized in the storage device of Fig. 1, being mounted with sheet 60 facing writing gun 12 and dielectric islands 61 facing reading gun 13. In operation, electrons from gun 12 penetrate sheet 60 and impose a charge on dielectric islands 61 in the manner described in the afore-mentioned Szegho-Reed application. Reading gun 13 is utilized to "read" the charge distribution on the dielectric islands 61 and, depending on the mode of operation, any leakage may be replenished by the reading gun 13. Aside from the penetration of sheet 62 by "writing" electrons, the operation of the storage electrode embodied in the invention is substantially identical to that described in the Szegho-Reed application.

It was pointed out, in connection with the embodiment of Fig. 2, that the apertures or interstices of supporting structure 62 have an area substantially larger than the areas of the insulating or dielectric islands 61. If these openings are not large enough, a substantial proportion of islands 61 will be "shaded" from writing gun 12 and a distorted charge image may be produced. Furthermore, the charge which could be stored on these islands would be reduced. In a particular example of this embodiment, supporting structure 62 is a mesh having a fineness of 50 lines per linear inch.

Broadly, the method of constructing a storage electrode such as those illustrated in Figs. 2, 3 and 4 comprises forming a thin sheet 60 of electrically conductive material, and forming a plurality of dielectric islands 61 on the sheet.

More specifically, in forming sheet 60 for the embodiment shown in Fig. 2, an organic film such as nitrocellulose is disposed on one side of multi-apertured supporting structure or grid 62. A conductive material such as aluminum is then evaporated in high vacuum onto the mesh side of the organic film. The nitrocellulose film is drawn into the interstices of the mesh by its own surface tension to form a film of minimum area so that the evaporated aluminum film is disposed across the interstices in substantially coplanar relation with the mesh as shown in Fig. 2. The nitrocellulose film is then dissolved in amyl acetate or other suitable solution and subsequently the structure is rinsed in a solution of alcohol and ether to remove any remaining traces of the organic film. Next, a fine mesh, 400 lines to the linear inch for example, is placed close to the aluminum film and an electrically insulating material, such as silicon dioxide, aluminum oxide or fluorides of calcium, barium, magnesium, is evaporated at a distance from the film. Thereby, evaporated material is advanced toward the aluminum film or sheet in a stream and by passing the main stream through the mesh it is divided into a plurality of individual streams directed substantially perpendicularly toward the sheet. Finally, material from each of the streams is deposited simultaneously on the sheet for a predetermined interval of time until individual islands are built up to a thickness of approximately 3,000 angstroms.

According to another embodiment, the method for forming the storage electrode of the signal storage device comprises the steps of forming a thin sheet of electrically conductive material, depositing on the sheet a second conductive material having an oxidizing characteristic different from that of the first-mentioned conductive material, and selectively oxidizing only the second conductive material to form an electrically insulating material.

More specifically, the thin sheet or film of electrically conductive material may be formed according to the process set out in the afore-described embodiment. This material, as in the preceding example, may be of aluminum. The second conductive material is chosen by its chemistry so that it has an oxidizing temperature lower than that of aluminum; examples of material with this characteristic are chromium and magnesium. It is important that when the second conductive material is oxidized an electrically insulating or dielectric material is produced. The chromium or magnesium may be electroplated on the aluminum sheet by the well known photoengraving process to deposit the second material in a predetermined pattern, as for example, that represented by the islands 61 disposed on sheet 60 of Fig. 5. Another suitable configuration would be in the form of bars which extend parallel to one another along the surface of sheet 60. The entire strtucture then is baked at a temperature intermediate the oxidizing temperatures of each of the conductive materials, which in the example utilizing aluminum and chromium is 450° C. The chromium thereby is selectively oxidized to form chromic oxide ($Cr_2O_3$) which is a good dielectric or electrically insulating material, the aluminum remaining unchanged.

Alternatively, a storage electrode of the type illustrated in Figs. 3 and 4, may be formed by evaporating an electrically conductive material, such as aluminum, in oxygen maintained at low pressure onto a nitrocellulose film stretched across a supporting ring. This forms sheet 60 and either of the two methods afore-described may be employed for depositing islands 61 onto the sheet.

In summary, the present invention provides a novel storage electrode for a signal storage device, particularly suitable for use in a device of the type disclosed in the aforementioned application. The storage electrode, just described, when employed in such a signal storage device is operable in a manner similar to that disclosed for the storage electrode in the Szegho-Reed application. Storage and reproduction of half-tone signals, storage of signals for controllable periods of time, long time storage, and operation at relatively low accelerating potentials may be accomplished.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A storage electrode for a signal-storage device, consisting essentially of an electron-permeable, imperforate sheet of conductive material having a thickness less than the planar dimensions thereof and a plurality of secondary-electron-emissive dielectric islands uniformly distributed on one surface of said sheet and extending therefrom for a distance of the order of magnitude of the thickness of said sheet.

2. A storage electrode for a signal-storage device, consisting essentially of an electron-permeable, imperforate sheet of conductive material having a thickness less than 10,000 angstroms and a plurality of secondary-electron-emissive dielectric islands uniformly distributed on one surface of said sheet and extending therefrom for a distance of the order of magnitude of the thickness of said sheet.

3. A storage electrode for a signal-storage device, consisting essentially of an electron-permeable, imperforate sheet of conductive material having a thickness in the neighborhood of 2,000 angstroms and a plurality of secondary-electron-emissive dielectric islands uniformly distributed on one surface of said sheet and extending therefrom for a distance of the order of magnitude of the thickness of said sheet.

4. A storage electrode for a signal-storage device, consisting essentially of an electron-permeable, imperforate sheet of conductive material having a thickness less than the planar dimensions thereof and a plurality of secondary-electron-emissive dielectric islands uniformly distributed on one surface of said sheet, covering approximately 60% of the area thereof and extending therefrom for a distance of the order of magnitude of the thickness of said sheet.

5. A storage electrode for a signal-storage device, consisting essentially of an electron-permeable, imperforate sheet of conductive material having a thickness less than the planar dimensions thereof and a plurality of secondary-electron-emissive dielectric islands uniformly distributed on one surface of said sheet and extending therefrom for a distance in the neighborhood of 3,000 angstroms.

6. A storage electrode for a signal-storage device, comprising: an electron-permeable, imperforate sheet of conductive material having a thickness less than the planar dimensions thereof; a plurality of dielectric islands distributed in a predetermined pattern on one surface of said sheet and extending therefrom for a distance of the order of magnitude of the thickness of said sheet; and a supporting structure for said sheet, immediately adjacent and extending in a plane parallel thereto, said structure including a plurality of apertures each having an area larger than the area of individual ones of said dielectric islands.

7. A storage electrode for a signal-storage device, comprising: an electron-permeable, imperforate sheet of conductive material having a thickness less than the planar dimensions thereof; a plurality of dielectric islands distributed in a predetermined pattern on one surface of said sheet and extending therefrom for a distance of the order of magnitude of the thickness of said sheet; and a conductive, supporting structure immediately adjacent and electrically connected to said sheet and extending in a plane parallel thereto, said structure including a plurality of apertures each having an area larger than the area of individual ones of said dielectric islands.

8. A storage electrode for signal-storage device, consisting essentially of a conductive, electron-permeable sheet having a thickness less than the planar dimensions thereof, and including a pattern of conductive segments extending from said sheet to a plane parallel thereto and defining a plurality of indentations; and a plurality of dielectric islands disposed within individual ones of said indentations and extending to a plane substantially coplanar with the plane of said conductive segments.

9. A storage electrode for a signal-storage device, consisting essentially of a conductive, electron-permeable sheet having a thickness less than the planar dimensions thereof, and including a pattern of conductive segments extending from said sheet to a plane parallel thereto spaced from said sheet by a distance of the order of magnitude of the thickness thereof, said conductive segments having a spacial distribution defining a plurality of indentations; and a plurality of dielectric islands disposed within individual ones of said indentations and extending to a plane substantially coplanar with the plane of said conductive segments.

References Cited in the file of this patent

UNITED STATES PATENTS

| | | |
|---|---|---|
| 2,161,643 | Strubig | June 6, 1939 |
| 2,162,808 | Gallup | June 20, 1939 |
| 2,175,701 | Rose | Oct. 10, 1939 |
| 2,269,588 | Iams | Jan 13, 1942 |
| 2,415,842 | Oliver | Feb. 18, 1947 |
| 2,431,113 | Glyptis et al. | Nov. 18, 1947 |
| 2,462,569 | Sziklai | Feb. 22, 1949 |
| 2,481,458 | Wertz | Sept. 6, 1949 |
| 2,506,741 | Rose | May 9, 1950 |
| 2,540,635 | Steier | Feb. 6, 1951 |
| 2,544,753 | Graham | Mar. 13, 1951 |
| 2,545,595 | Alvarez | Mar. 20, 1951 |
| 2,547,638 | Gardner | Apr. 3, 1951 |
| 2,588,019 | Law | Mar. 4, 1952 |

OTHER REFERENCES

The Graphecon by Pensak, RCA Review, March 1949, vol. X, pp. 59–73.